UNITED STATES PATENT OFFICE.

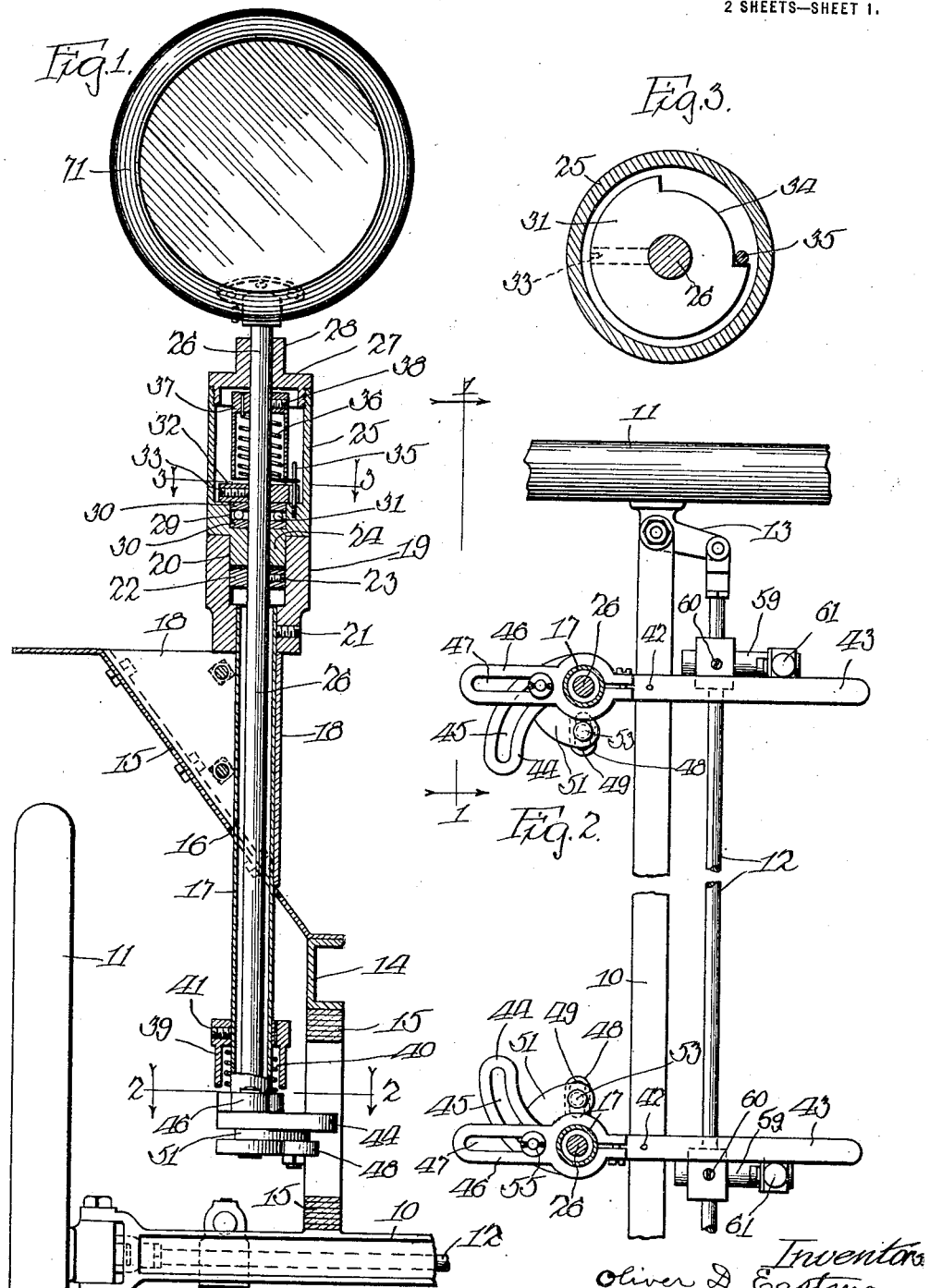

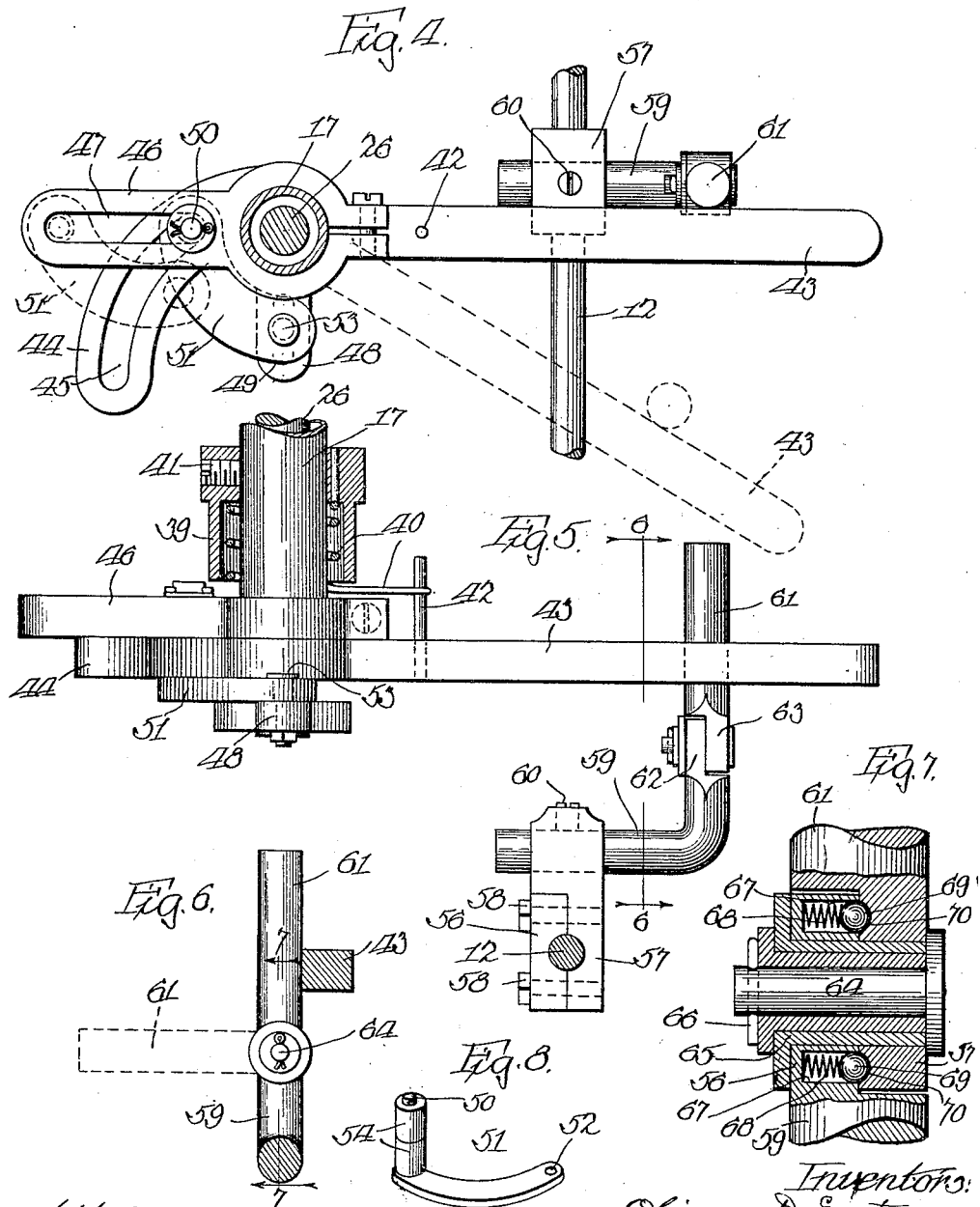

OLIVER D. EASTMAN AND WALTER M. GREGG, OF MUSKEGON, MICHIGAN.

DIRIGIBLE LIGHTING MECHANISM.

1,324,651. Specification of Letters Patent. Patented Dec. 9, 1919.

Application filed April 25, 1919. Serial No. 292,624.

*To all whom it may concern:*

Be it known that we, OLIVER D. EASTMAN and WALTER M. GREGG, citizens of the United States of America, residing at Muskegon, in the county of Muskegon and State of Michigan, have invented certain new and useful Improvements in Dirigible Lighting Mechanisms, of which the following is a specification.

This invention relates to a mechanism for controlling and directing the rays of light of headlight lamps by connection and operation with the steering mechanism of mobile apparatus. In the present instance we have shown, and will hereinafter describe it in connection with and for manipulating the headlights on automobiles, yet, we desire it to be understood that we do not wish to be limited in the use of the invention to any specific purpose for which it may be employed, nor do we wish to be understood as limiting ourselves to the exact construction and arrangement of the various parts of the device as herein shown and described, as we may employ it for any purpose for which it may be adapted, and may vary the details of construction without departing from the principle and spirit of the invention.

The invention consists in certain peculiarities of the construction, novel combination, arrangement and operation of the various parts thereof as will be hereinafter more fully set forth and specifically claimed.

The principal object of the invention is to provide a mechanism of the above described general character, which shall be simple and inexpensive in construction, strong, durable, efficient and substantially noiseless in operation, the parts of which shall be so made and arranged as not likely to get out of order through use.

A futher object of the invention is to provide a mechanism when used on automobiles that the rays of light from the headlight lamps thereof may be directed to the front of the machine or to any desired angle alternating to the right or to the left as may be desired by the operator at the steering wheel.

Various other objects and advantages of the invention will be disclosed in the subjoined description and explanation.

In order to enable others skilled in the art to which our invention pertains to make and use the same we will now proceed to describe it, referring to the accompanying drawings which serve to illustrate an embodiment of the invention, in which—

Figure 1 is a vertical view partly in section and partly in elevation taken on line 1—1 of Fig. 2, looking in the direction indicated by the arrows, and illustrating a portion of an automobile frame, a part of the front axle, and one wheel thereof, showing the mechanism mounted and supported by one of the mud guards;

Fig. 2 is a plan view partly in section taken on line 2—2 of Fig. 1, showing two of the mechanisms mounted in their respective positions relative to the wheels of the automobile and illustrating the front axle and steering rod of the same shortened for the convenience of illustration;

Fig. 3 is a plan sectional view taken on line 3—3 looking in the direction indicated by the arrows, showing means for restricting the movement of the lamp carrying or supporting rod;

Fig. 4 is an enlarged plan view partly in section taken on line 2—2 of Fig. 1;

Fig. 5 is a side view thereof;

Fig. 6 is a view in elevation of one of the operating levers and its release arm for the operating finger on the lamp supporting shaft or rod, showing by dotted lines the position to which the release arm may be turned, said view being taken on line 6—6 of Fig. 5, looking in the direction indicated by the arrows, Fig. 7 is a greatly enlarged sectional view taken on line 7—7 of Fig. 6, looking in the direction indicated by the arrows, and illustrating the construction of the safety brake used on the operating levers, and Fig. 8 is a detached perspective view of the segmental link used in connection with the levered finger and one of the slotted arms of the cam mechanism used for turning the lamp carrying shaft.

Like numerals of reference refer to corresponding parts throughout the different views of the drawings.

When our mechanism is used on automobiles, for which it is especially intended, we by preference locate one of the mechanisms near each of the front wheels of the automobile at the inner sides of said wheels, but as each of the mechanisms are identical in construction we have shown only one of them, except in Fig. 2, as a duplicate showing thereof is deemed unnecessary.

Referring now to Figs. 1 and 2 of the drawings, the reference numeral 10 designates the front axle of an automobile, which is provided as usual with wheels 11 of the ordinary or well-known construction, which wheels are steered by means of a steering rod 12 and levers 13 in the well-known way, it being understood that the rod 12 is connected to a rod extended into the body of the automobile for the purpose of shifting the rod 12 back and forth. Mounted on each side of the frame 14 or chassis, which is supported by springs 15 in the ordinary or usual manner, is a mud guard 15 which extends outwardly and over the front wheels 11. Each of these guards is provided with an opening 16, through which is vertically extended a supporting tube or casing 17, which is rigidly supported in the opening 16 of the mud guard by means of a bracket 18, which is clamped therearound and secured to the upper surface of the mud guard, as is clearly shown in Fig. 1 of the drawings. Mounted on the upper end of the supporting tube or casing is a head piece 19, which is provided with a vertical socket 20 and is fixed to the casing 17 by a set screw 21. Located in the socket 20 of the member 19 is a disk 22, which is secured to the lamp carrying rod by means of a set screw 23 at a suitable distance from the bottom of said socket. Located in the socket 20 is a reduced portion 24 on the lower end of a barrel 25, which reduced portion is provided with a vertical opening for the reception of the lamp supporting rod or shaft 26, which extends at its upper and lower ends through the supporting casing or tube 17, as well as through the barrel 25, which rests on the upper end of the head 19, as shown. Surrounding the upper portion of the shaft 26 and mounted on the upper end of the barrel 25 is a cap 27 which has an upward extension 28 to act as a bearing for the shaft or rod 26 for the lamp. The barrel 25 is provided just above the reduced portion 24 thereof with a socket 29, in which is located a pair of race plates 30, between which are interposed anti-friction balls 31 for facilitating the rotary movement of the lamp carrying shaft. Mounted on the upper race plate 30 within the barrel 25 is a cam disk 32, which is fixed to the shaft 26 by means of a set screw 33, and said cam disk has, as shown in Fig. 3, a segmental cut-out portion 34 to co-act with a pin 35 vertically secured in the barrel 25 at one side of the socket 31 therein for restricting the rotary movement of the lamp shaft. As shown the pin 35 extends upwardly above the upper surface of the disk 31 and has secured thereto one end of a torsion spring 36 which is coiled around the shaft 26 and has its upper end secured to the top of a casing 37 which is fixed by means of a screw 38 to the lamp shaft, so that said casing will rotate therewith. This casing is located within the barrel 25, as shown.

Surrounding the lower portion of the supporting tube or casing 17 is another casing or housing 39 for an auxiliary torsion spring 40 which is secured at one of its ends to the upper portion of the casing 39, which casing is fixed to the tube 17 by means of a screw 41 or otherwise. The other end of the spring 40 is extended under the casing 39 and rearwardly therefrom and is connected to a pin 42 extended upwardly from a finger 43, which is loosely mounted on the lower portion of the supporting tube or casing 17 of the mechanism and extends rearwardly therefrom across the steering rod 12, and has at its other end or front portion an eccentric arm 44 which is provided with an eccentric or cam race 45. Clamped or fixed to the casing or tube 17 just above the finger 43 is an arm 46, which has a longitudinal slot 47 extended to near its free end. Fixed on the lower end of the lamp carrying shaft 26 is another arm 48 which has a slot 49 therein for the reception of a pin or projection 50 on one end of a segmental link 51, which has at its other end an opening 52 for the reception of a bolt 53 used for pivotally securing said link to the arm 48. The pin or projection 50 on the link 51 is by preference provided with a pair of anti-friction rollers 54, which have independent action. The pin with its rollers is extended through the slots or races 45 and 47 of the members 44 and 46 and may be held in position by means of a cotter pin 55 extended through the upper portion of said pin. Mounted on the steering rod near each of its ends and outwardly of the fingers 43, when two of the mechanisms are used on an automobile, which will generally be the case, is a clamping block consisting of two members 56 and 57 secured together by bolts 58 around the steering rod. The upper portion of the member 57 is provided with a transverse opening for the reception of an operating lever 59 which is held in said opening by a screw 60. This operating lever consists of two members 59 and 61, which have at their adjacent ends off-set portions 62 and 63 respectively. These portions have flat inner surfaces and rounded ends and are pivotally connected together by means of a pivot 64 and a collar 65 surrounding the same, said collar being held in place by means of a cotter pin 66 extended through a suitable opening in one end of the pivot 64.

As is clearly shown in Fig. 7 of the drawings, the member 59 is provided with at least a pair of openings 67, which are located diametrically opposite each other, and each has nested therein a spring 68 and a ball 69. The member 57 is provided in its inner face with a plurality of pits or depressions 70, which are arranged to register with the openings 67 in the other member. By this arrangement it will be understood that the balls 69 will be pressed into a pair of the pits 70 and will thus hold the releasing member 61 of the operating lever in position to engage the finger 43 of the mechanism, yet in such a way that said releasing member may be turned to about the position shown by dotted lines in Fig. 6, when it is desired that said member shall not engage the finger, or that the mechanism shall not be operated, which will be the case in daytime or when a light is not required. After the releasing member 61 has been turned to its inoperative position, as shown in Fig. 6 by dotted lines, it is apparent that the balls 69 will engage a pair of pits in said member arranged for this purpose. To extend the member 61 in its operative position it is only necessary to turn it upwardly on its pivot, when, it is apparent, that the balls will be pressed against the springs 68 and so held until another pair of the pits are brought into register with the openings 67 in the member 56.

The application and operation of the mechanism is as follows: One of the devices is mounted on each side of the mobile apparatus and they operate individually and alternately, depending on the direction in which the mobile apparatus is steered. While the mobile apparatus is in its normal position or adapted for travel in a straight line the rays of light from the lamp 71 will be directed straight ahead or forwardly from the front of the apparatus, and the operating lever and releasing arm thereof will remain in their normal positions, as shown by dotted lines in Fig. 6 of the drawings. While in this position the steering mechanism will have no connection with the lamp directing mechanisms, as they are not required for daylight service. When lights are required the releasing members 61 of the operating levers are placed in a vertical position, as shown in Figs. 2, 4 and 5. When the mobile apparatus is turned to the right the releasing member 61 of one of the mechanisms will engage the side of the finger 43, and the lamp connected therewith will be turned to the right, thus throwing the rays in the direction that the machine is turned, while the other lamp will remain in its normal position. When the machine is turned to a normal course the finger will be released from the pressure of the release member 61, and the spring 36, assisted by the spring 40, will return the lamp to its normal position, and the same operation will be performed when the machine is turned to the left. By means of our improvements, it is apparent that in turning corners or in turning to the roadside the rays of light are thrown in the direction to which the apparatus is turned, thus avoiding ditch accidents and corner collisions. It is also apparent that in case of accident or any other cause the finger or fingers should be prevented by the release member or members 61 from returning to normal position, a quick jerk on the steering wheel will force the finger or fingers to its or their normal position, as shown in Fig. 2, and the lamp or lamps will assume their normal positions and the steering mechanism will have freedom of action for directing the apparatus in any required direction.

Having thus fully described our invention what we claim as new and desire to secure by Letters Patent is:

1. A device of the character described, consisting of an automobile having a steering mechanism, a vertically disposed casing suitably mounted on the automobile, a shaft extended through both ends of the casing and mounted for rotative movement thereon, a lamp mounted on the upper end of the shaft for movement therewith, a finger mounted on the lower end of the casing for rotative movement thereon, eccentric means connecting the arm portion of the finger with the shaft, and means on the steering mechanism for turning the finger in one direction.

2. A device of the character described, consisting of an automobile having a steering mechanism, a vertically disposed casing mounted on the automobile, a shaft extended vertically through the casing above and below the same and mounted for automatic movement in one direction and having means for limiting the revolution thereof, a lamp on the shaft, a horizontally disposed eccentrical finger mounted on the lower end of the casing for rotative movement thereon, a cam connecting the eccentric with the lower end of the shaft, means on the steering mechanism for engaging the finger and turning it in one direction.

3. A device of the character described, consisting of an automobile having a steering mechanism, a vertically disposed casing suitably mounted on the automobile, a shaft extended through the casing and mounted for automatic movement in one direction and for limited rotation, a lamp mounted on the shaft, a horizontally disposed finger mounted for rotative movement on the lower end of the casing, eccentric means connecting the arm portion of the finger with the shaft, and means on the steering mechanism for engaging the finger and turning it in one direction.

4. In a device of the character described, the combination with an automobile, of a steering rod mounted near the front axle thereof for shiftable movement, a supporting casing vertically mounted near said rod and one of the front wheels of the automobile, a spring-actuated lamp carrying shaft supported by said case and extended through the lower end thereof, a spring-pressed finger mounted around to the lower portion of said shaft and extended across the steering rod, a slotted arm fixed to the shaft above said finger and extended in the opposite direction, said finger having a cam slot in the arm portion thereof, a slotted arm fixed on the shaft at a distance below the finger, a cam link located between the last named arm and the finger and pivotally and movably connected at one of its ends to said arm, a projection extended from the other end of said link and engaging the slots of the lever portion of the finger and of the first named arm, and adjustable means mounted on the steering rod for engagement with the finger.

5. A device of the character described, consisting of a vertically supported casing, a shaft in the casing mounted for rotative movement, a lamp on the upper end of the shaft, automatic means in the casing for turning the shaft in one direction, a finger rotatively mounted on the lower end of the casing, means for loosely securing the arm portion of the finger with the lower end of the shaft, auxiliary means on the casing connected with the finger for turning the finger and shaft in the same direction as the first named means.

6. A device of the character described, consisting of an automobile, a vertically disposed casing mounted thereon, a shaft in the casing extended below the casing, a lamp on the upper end of the shaft, automatic means in the casing for rotating the shaft in one direction, a finger rotatively mounted on the lower end of the casing, eccentric means connecting the arm portion of the finger with the lower end of the shaft, auxiliary automatic means on the casing connected with the finger for turning the finger and shaft in the same direction as the first named automatic means, and means on the automobile for turning the finger and shaft in an opposite direction.

7. A device of the character described, consisting of a suitably supported vertically disposed casing, a vertically disposed shaft arranged therein, automatic means in the casing for rotating the shaft in one direction, and auxiliary automatic means on the casing to coöperate with the first named means.

OLIVER D. EASTMAN.
WALTER M. GREGG.